United States Patent [19]

Hernandez

[11] 4,017,935
[45] Apr. 19, 1977

[54] DIP STICK CLEANER

[76] Inventor: Reginaldo A. Hernandez, 33 NW. 59th Ave., Miami, Fla. 33126

[22] Filed: Dec. 4, 1975

[21] Appl. No.: 637,707

[52] U.S. Cl. .......................... 15/210 B; 33/126.7 R
[51] Int. Cl.² ................... G01F 15/12; G01F 23/04
[58] Field of Search ....... 15/104.92, 210 B, 257.05; 33/126.7 R, 126.7 A; 401/124, 128, 130

[56] References Cited

UNITED STATES PATENTS

| 1,394,288 | 10/1921 | Dossett | 222/557 X |
| 1,553,915 | 9/1925 | Rix et al. | 15/210 B |
| 1,871,208 | 8/1932 | Bouchard | 15/210 B |
| 1,947,833 | 2/1934 | Dolbier | 15/210 B |
| 2,855,682 | 10/1958 | Norgard | 15/210 B |
| 3,334,639 | 8/1967 | Grant | 15/210 B X |

FOREIGN PATENTS OR APPLICATIONS

| A69,805 | 9/1958 | France | 15/210 B |
| 330,614 | 7/1958 | Switzerland | 15/210 B |

Primary Examiner—Daniel Blum
Attorney, Agent, or Firm—Malin & Haley

[57] ABSTRACT

A dip stick cleaner for use with a dip stick of an automobile for indicating the oil level in the engine of the automobile or the like comprising a means for attaching the device to a dip stick tube found in a conventional automobile engine and a cleaning portion including a slot for receiving a dip stick which is moveably positionable relative to said supporting means.

1 Claim, 4 Drawing Figures

DIP STICK CLEANER

BACKGROUND OF THE INVENTION

This invention relates generally to a dip stick cleaner for a vehicle engine and specifically to a cleaner for use with an internal combustion engine which has oil as a lubricant to indicate the oil level contained in the pan of the engine. In the past, dip sticks have been cleaned with rags or pieces of paper which are disposed creating additional waste. Dip stick cleaners shown in the prior art are complex in construction and cumbersome to use. The purpose of this invention is to provide a re-usable dip stick cleaner that is easy to use non-complex in construction and eliminate the use of papers and rags to determine engine oil quantities.

BRIEF DESCRIPTION OF THE INVENTION

A dip stick cleaner for use in a conventional oil containing engine which is used to clean the dip stick for indicating the quantity of oil comprising a means for mounting the device on a conventional dip stick tube and a planar surface having a slotted portion for receiving a dip stick, said planar surface being moveably mounted relative to the mounting means to provide access to the dip stick tube. The device includes operation in a first position where the dip stick is drawn through the slotted portion aligned with the axis of the tube removing oil from the dip stick. In a second position the slotted surface is rotated away from the tube axis so that the clean dip stick can be inserted directly into the dip stick tube. The slotted elements are sized to receive a dip stick and to contact the sides of the dip stick to clean it off thoroughly while it is being drawn therethrough.

It is an object of this invention to provide an improved dip stick cleaner which is moveably mounted on said dip stick.

In accordance with these and other objects which will be apparent hereinafter, the instant invention will now be described with particular reference to the accompanying drawings.

PREFERRED EMBODIMENT OF THE INVENTION

Figure 1:
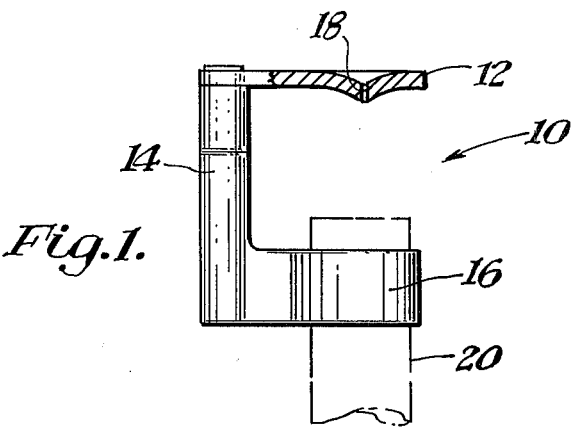
FIG. 1 shows a side elevational view of the instant invention with a conventional dip stick tube shown in phantom.

Referring now to the drawings and in particular FIG. 1, the instant invention is shown generally at 10 comprised of and mounted on a conventional dip stick tube 20 found in a conventional engine such as an internal combustion engine which has an oil pan and utilizes a dip stick for measuring the amount of oil in the pan with a resilient circumferential supporting means 16 which may have a split to allow it to be adaptable for mounting resiliently on and about the surface of a conventional dip stick tube 20. Attached to the supporting means 16 is a supporting shaft 14 vertically oriented which receives and allows the cleaning body 12 which is a resilient planar member having a dip stick receiving slot 18 disposed along its longitudinal face to be hingeably mounted so that body 12 may be moved and rotated relative to the supporting means 16.

Figure 2:
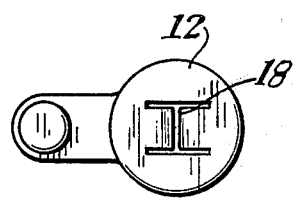
FIG. 2 shows a top plan view of the instant invention in one operation.

FIG. 2 shows the slot 18 that receives a dip stick.

Figure 3:
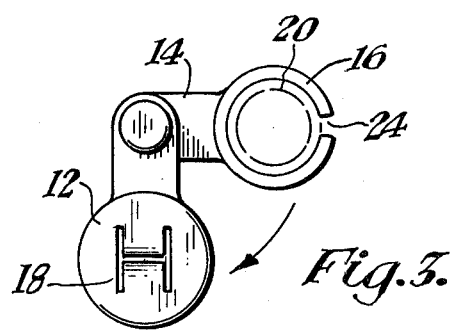
FIG. 3 shows a top plan view of the instant invention with the dip stick cleaner slot rotated out of alignment with the tube opening.

FIG. 3 shows the device such that the cleaning surface 12 has been rotated away from the dip stick aperture 20 so that the dip stick may be freely inserted into the tube for measurement of oil without interference of the cleaning surface.

Figure 4:
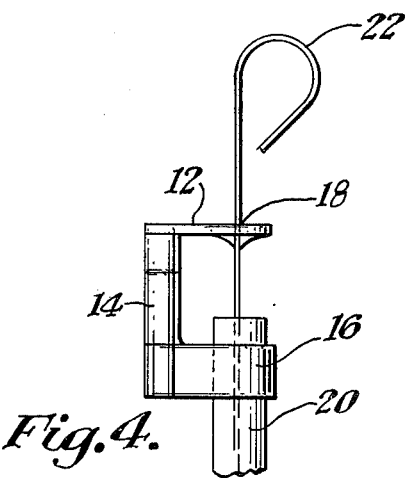
FIG. 4 is a side elevational view with a dip stick positioned in the tube.

FIG. 4 shows the device during an operation in which the dip stick 22 has been inserted down through slot 18 comprised of resiliently removeably flaps so that the dip stick itself is within the dip stick tube 20 and as it is withdrawn from the dip stick tube 20, oil on the surface of the dip stick 22 will be removed by the slot 18 flaps contacting the dip stick. After the dip stick has been cleaned, the upper cleaning surface 12 is rotated away from the tube opening so that the cleaned dip stick may be inserted into the tube to allow for measurement of oil. The dip stick may then be reinserted back into the tube and housed with the device in either position when not in operation.

The instant invention has been shown and described herein in what is considered to be the most practical and preferred embodiment. It is recognized, however, that departures may be made therefrom within the scope of the invention and that obvious modifications will occur to a person skilled in the art.

What I claim is:

1. A dip stick cleaner for use in cleaning a dip stick as utilized in a conventional oil containing combustion engine, said engine having a conventional dip stick tube, the invention comprising:
   a supporting means attachable about said conventional dip stick tube;
   a resilient planar member having a slotted portion for receiving and cleaning a dip stick;
   a means for highly connecting said planar member to said supporting means and rotatable from a first position away from said conventional tube to a second position over the top of said tube, with the planar member substantially at right angles to the length of the tube.

* * * * *